United States Patent
Bowers et al.

(10) Patent No.: US 6,299,199 B1
(45) Date of Patent: Oct. 9, 2001

(54) INFLATABLE SIDE CURTAIN

(75) Inventors: Paul A. Bowers, Ray; Daniel R. Sutherland, East Pointe; Ernst M. Faigle, Dryden, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/398,975

(22) Filed: Sep. 17, 1999

(51) Int. Cl.$^7$ .................................................. B60R 21/22
(52) U.S. Cl. ..................................... 280/730.2; 280/743.1
(58) Field of Search ............................. 280/730.2, 730.1, 280/729, 743.1, 743.2, 749, 753

(56) References Cited

U.S. PATENT DOCUMENTS

| | | | |
|---|---|---|---|
| 4,963,412 | * 10/1990 | Kokeguchi | 280/743.1 |
| 5,316,336 | * 5/1994 | Taguchi et al. | 280/730.2 |
| 5,382,051 | 1/1995 | Glance . | |
| 5,452,914 | * 9/1995 | Hirai | 280/743.1 |
| 5,505,485 | 4/1996 | Breed . | |
| 5,524,926 | 6/1996 | Hirai et al. . | |
| 5,599,042 | 2/1997 | Shyr et al. . | |
| 5,630,620 | * 5/1997 | Hirai et al. | 280/743.1 |
| 5,746,446 | 5/1998 | Breed et al. . | |
| 5,865,462 | 2/1999 | Robins et al. . | |
| 6,056,316 | * 5/2000 | Yamaji et al. | 280/730.2 |
| 6,073,961 | * 6/2000 | Bailey et al. | 280/730.2 |

* cited by examiner

Primary Examiner—Peter C. English
(74) Attorney, Agent, or Firm—Tarolli, Sundheim, Covell, Tummino & Szabo L.L.P.

(57) ABSTRACT

Apparatus (10) for helping to protect an occupant of a vehicle (12) which has a side structure (16) and a roof (18) comprises an inflatable vehicle occupant protection device (14). The vehicle occupant protection device (14) is inflatable away from the vehicle roof (18) into a position between the side structure (16) of the vehicle (12) and a vehicle occupant. An inflation fluid source (24) provides inflation fluid for inflating the vehicle occupant protection device (14). The vehicle occupant protection device (14) comprises a pair of overlying panels (40 and 42) that have overlapping portions secured together along at least a portion of the periphery of the panels to form a substantially airtight volume defined by the panels. The panels (40 and 42) are made of gas impermeable elastomeric material.

4 Claims, 2 Drawing Sheets

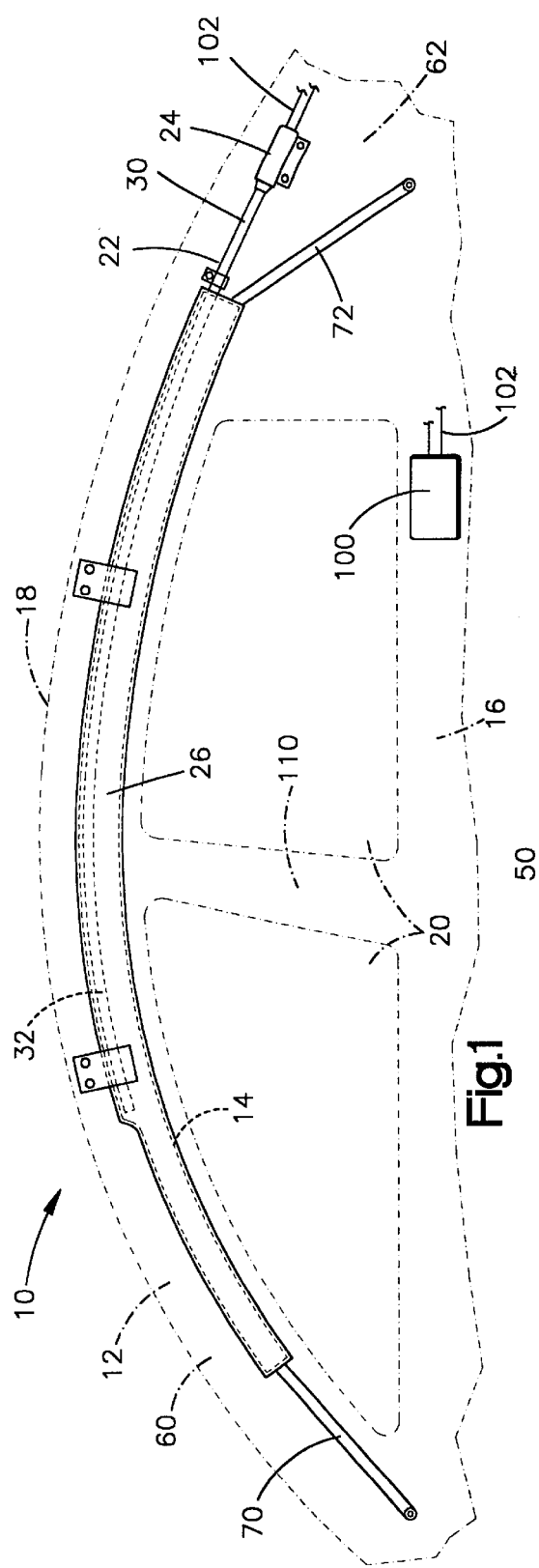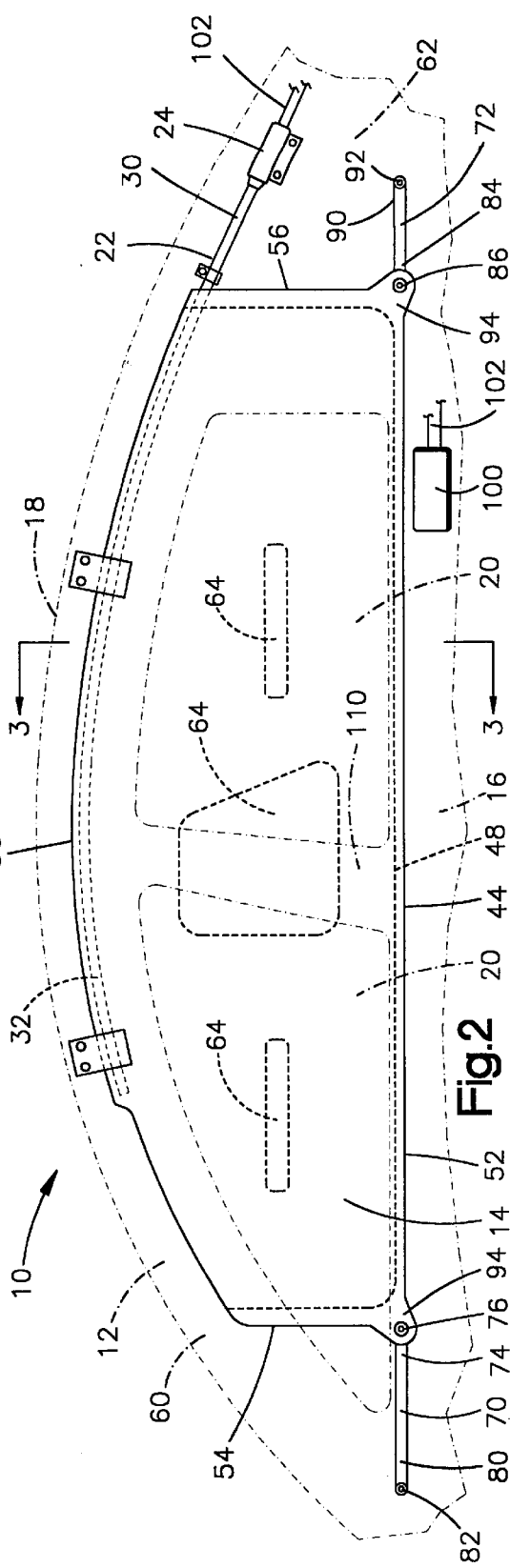

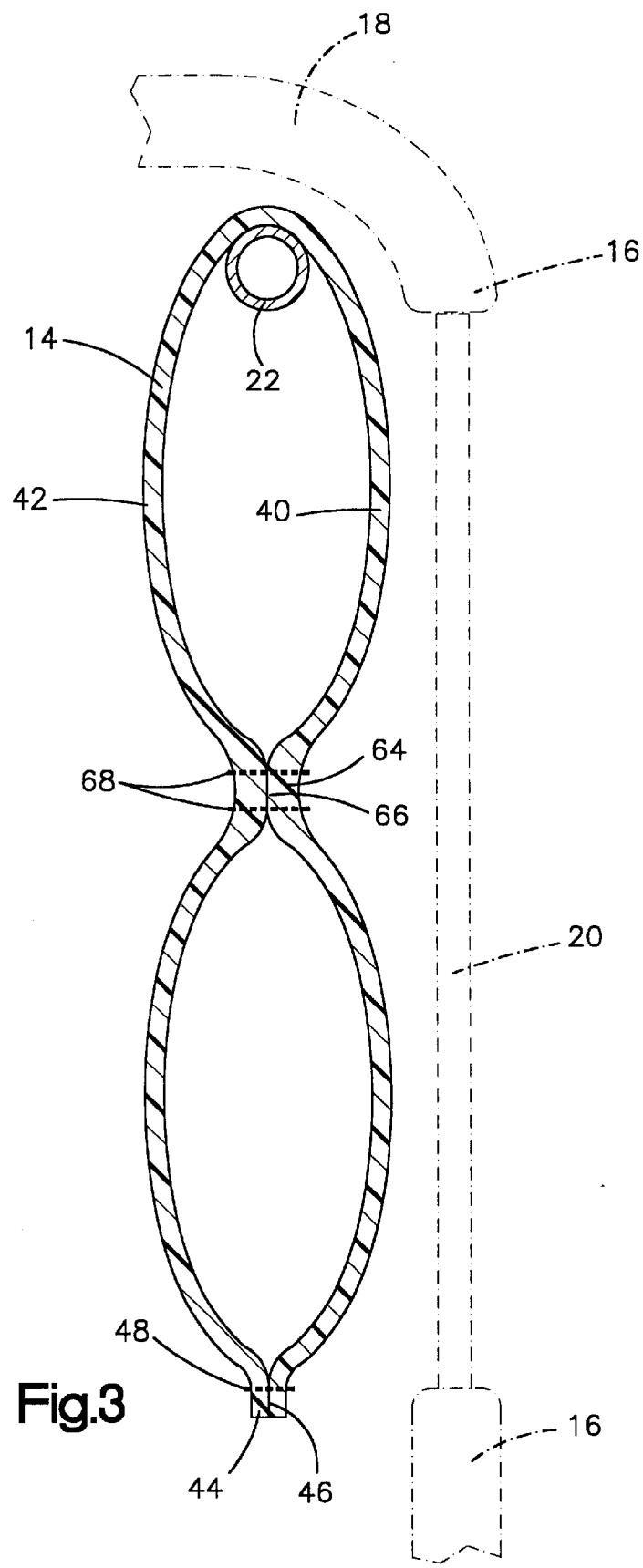

INFLATABLE SIDE CURTAIN

FIELD OF THE INVENTION

The present invention relates to an inflatable vehicle safety apparatus for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle which has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the vehicle occupant protection device. The vehicle occupant protection device comprises a pair of overlying panels that have overlapping portions secured together along at least a portion of the periphery of the panels to form a substantially airtight volume defined by the panels. The panels are made of gas impermeable elastomeric material.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable vehicle safety apparatus illustrating the safety apparatus in a deflated condition;

FIG. 2 is a schematic view of the vehicle safety apparatus of FIG. 1 in an inflated condition; and FIG. 3 is a sectional view of the vehicle safety apparatus taken generally along line 3—3 in FIG. 2.

DESCRIPTION OF PREFERRED EMBODIMENTS

As representative of the present invention, a vehicle safety apparatus 10 helps to protect an occupant of a vehicle. As shown in FIGS. 1 and 2, the safety apparatus 10 includes an inflatable curtain 14, which is mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32, which is disposed in the inflatable curtain 14. The second end portion 32 of the fill tube 22 has a plurality of openings (not shown) that provide fluid communication between the fill tube 22 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid.

The safety apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

As best illustrated in FIG. 3, the inflatable curtain 14 comprises first and second panels 40 and 42 that are arranged in an overlying manner. Overlapping portions of the first and second panels 40 and 42 are secured together, forming a seam 44 (FIGS. 2 and 3) that extends along the periphery of the panels. In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together along a seam 44 that extends around the entire periphery of the panels to form the inflatable curtain 14.

The first and second panels 40 and 42 are constructed of a gas impermeable elastomeric material. By elastomeric it is meant that the material is a natural or synthetic polymer having properties of deformation and elastic recovery. These materials stretch rapidly and considerably under tension, reaching high elongations with low damping, that is, little loss of energy as heat. Examples of such materials include natural rubber and synthetic rubbers such as sodium polysulfide, polychloroprene (neoprene), butadiene-styrene copolymers, acrylonitrilebutadiene copolymers, ethylenepropylenediene rubbers, synthetic polyisoprene, butyl rubber, polyacrylonitrile, silicone, epichlorohydrin, and polyurethane. The first and second panels 40 and 42 may be formed of single or multi-layered sheets or films constructed of the elastomerc material.

The first and second panels 40 and 42 are secured together along the seam 44 by known means 46 such as dielectric sealing, ultrasonic bonding, heat sealing, or adhesives. The seam 44 may be reinforced by stitching 48, which comprises thread sewn through the area of the seam 44. The seam 44 is airtight and, thus, the inflatable curtain 14 has a substantially airtight volume.

When the inflatable curtain 14 is in the inflated condition, the first panel 40 is positioned adjacent the side structure 16 of the vehicle 12. The inflatable curtain 14 (FIG. 2) includes a top edge 50 and an opposite bottom edge 52. The top edge 50 is positioned adjacent to the intersection of the roof 18, and the side structure 16 of the vehicle 12. The inflatable curtain 14 also includes a front edge 54 and an opposite rear edge 56. The front edge 54 is positioned adjacent to an A pillar 60 of the vehicle 12. The rear edge 56 is positioned adjacent to a C pillar 62 of the vehicle 12.

Overlying parts of the first and second panels 40 and 42 may be secured together at desired locations to form non-inflatable portions 64 of the inflatable curtain 14. As illustrated in FIG. 3, the first and second panels 40 and 42 are secured together along the non-inflatable portions 64 by known means 66 such as dielectric sealing, ultrasonic bonding, heat sealing, or adhesives. The non-inflatable portions 64 of the inflatable curtain 14 may be reinforced by stitching 68.

As illustrated in FIG. 2, the inflatable curtain 14 may include first and second tethers 70 and 72 that connect the curtain to the side structure 16 of the vehicle 12. A first end 74 of the first tether 70 is connected to the inflatable curtain 14 via a first eyelet 76 located near the intersection of the front edge 54 and the bottom edge 52 of the inflatable curtain 14. A second end 80 of the first tether 70 is connected to the side structure 16 of the vehicle 12 at a first location 82 on or near the A pillar 60 of the vehicle. A first end 84 of the second tether 72 is connected to the inflatable curtain 14 via an second eyelet 86 located near the intersection of the rear edge 56 and the bottom edge 52 of the inflatable curtain 14. A second end 90 of the second tether 72 is connected to the side structure 16 of the vehicle 12 at a second location 92 on or near the C pillar 62 of the vehicle.

The first and second eyelets 76 and 86 are located on tab portions 94 which extend from the inflatable curtain 14. The first and second eyelets 76 and 86 are surrounded by and extend through the tab portions 94. The tab portions 94 comprise portions of the first and second panels 40 and 42 that are secured together by known means such as dielectric sealing, ultrasonic bonding, heat sealing, or adhesives. The tab portions 94 may be reinforced by stitching (not shown). The tab portions 94 help to block leakage of inflation fluid through the first and second eyelets 76 and 86.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 100 provides an electrical signal over lead wires 102 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. In the inflated condition, the inflatable curtain 14 extends between the A pillar 60 and the C pillar 62 of the vehicle 12 and overlies at least a portion of the A pillar, C pillar, and a B pillar 110 of the vehicle. The inflatable curtain 14, when inflated, helps to protect a vehicle occupant in the event of a vehicle rollover or a side impact to the vehicle 12.

As the inflatable curtain 14 inflates, the first and second tethers 70 and 72 move downward with the curtain from the position illustrated in FIG. 1 to the position illustrated in FIG. 2. The first and second tethers 70 and 72 help resist movement of the inflatable curtain 14 away from the side structure 16 of the vehicle 12 when the curtain 14 is inflated.

As a feature of the present invention, the substantially airtight construction of the inflatable curtain 14 helps to ensure that the curtain will remain inflated throughout the duration of a side impact to the vehicle 12 or a vehicle rollover. The inflatable curtain 14, when inflated, remains inflated for more than four seconds, preferably more than seven seconds.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

a vehicle occupant protection device that is inflatable away from the vehicle roof into a position between the side structure of the vehicle and a vehicle occupant; and an inflation fluid source that provides inflation fluid for inflating said vehicle occupant protection device;

said vehicle occupant protection device comprising a pair of overlying panels, said panels having overlapping portions secured together along at least a portion of the periphery of said panels to form a substantially airtight volume defined by said panels, said panels being made of gas impermeable elastomeric material, said vehicle occupant protection device being an inflatable curtain having a stored position extending along the side structure adjacent to the roof of the vehicle, said inflatable curtain being inflated away from the vehicle roof into said position between the side structure of the vehicle and a vehicle occupant, said overlapping portions of said panels being secured together to form at least one seam sealed by one of dielectric sealing, ultrasonic bonding, heat sealing and adhesives, said at least one seam being reinforced by stitching along said overlapping portions.

2. Apparatus for helping to protect an occupant of a vehicle that has a side structure and a roof, said apparatus comprising:

a vehicle occupant protection device that is inflatable away from the vehicle roof into a position between the side structure of the vehicle and a vehicle occupant; and an inflation fluid source that provides inflation fluid for inflating said vehicle occupant protection device;

said vehicle occupant protection device comprising a pair of overlying panels, said panels having overlapping portions secured together along at least a portion of the periphery of said panels to form a substantially airtight volume defined by said panels, said panels being made of gas impermeable elastomeric material, said vehicle occupant protection device being an inflatable curtain having a stored position extending along the side structure adjacent to the roof of the vehicle, said inflatable curtain being inflated away from the vehicle roof into said position between the side structure of the vehicle and a vehicle occupant, said overlapping portions of said panels being secured together to form at least one seam sealed by one of dielectric sealing, ultrasonic bonding, heat sealing and adhesives, said seam including at least one tab, each said tab having an eyelet which is connectable to a tether, said tether helping to secure said inflatable curtain to the side structure of the vehicle.

3. Apparatus as defined in claim 2, wherein said tether helps to maintain said inflatable curtain in said position between the side structure of the vehicle and a vehicle occupant.

4. Apparatus for helping to protect an occupant of a vehicle that has a side structure and a roof, said apparatus comprising:

a vehicle occupant protection device that is inflatable away from the vehicle roof into a position between the side structure of the vehicle and a vehicle occupant; and an inflation fluid source that provides inflation fluid for inflating said vehicle occupant protection device;

said vehicle occupant protection device comprising a pair of overlying panels, said panels having overlapping portions secured together along at least a portion of the periphery of said panels to form a substantially airtight volume defined by said panels, said panels being made of gas impermeable elastomeric material, said vehicle occupant protection device being an inflatable curtain having a stored position extending along the side structure adjacent to the roof of the vehicle, said inflatable curtain being inflated away from the vehicle roof into said position between the side structure of the vehicle and a vehicle occupant, said panels having overlying parts, said overlying parts of said panels being secured together by one of dielectric sealing, ultrasonic bonding, heat sealing and adhesives, said overlying parts forming non-inflatable portions of said inflatable curtain, said non-inflatable portions of said inflatable curtain are reinforced by stitching along said non-inflatable portions.

* * * * *